Nov. 16, 1965  R. E. SANSON  3,217,566

GEAR TRANSMISSION

Filed Aug. 20, 1963  2 Sheets-Sheet 1

INVENTOR.
ROBERT E. SANSON
BY Frank Kahn
ATTORNEY

Nov. 16, 1965  R. E. SANSON  3,217,566

GEAR TRANSMISSION

Filed Aug. 20, 1963  2 Sheets-Sheet 2

INVENTOR.
ROBERT E. SANSON

BY Frank Kahn

ATTORNEY

United States Patent Office 3,217,566
Patented Nov. 16, 1965

3,217,566
GEAR TRANSMISSION
Robert E. Sanson, 1402 Reservoir Ave., Roslyn, Pa.
Filed Aug. 20, 1963, Ser. No. 303,253
11 Claims. (Cl. 74—804)

This invention relates to a transmission for rotatable devices and more particularly relates to a rolling gear transmission for providing smooth and positive coupling and uncoupling of driving and driven rotating members.

The conventional types of clutch for engaging and disengaging a driving connection, which rely on frictional engagement of discs and drums under spring pressure, have limited load capacity, are subject to ordinate wear, require frequent adjustments and in operation do not always provide smooth coupling.

It is an object of this invention to provide a novel transmission of much simpler and more rugged design which overcomes these disadvantages of the above prior art clutches.

Another object is to provide a transmission which does not utilize frictional engagement of parts to effect the driving connection.

Another object is to produce a transmission having a minimum of parts which provides a positive driving action.

A further object is to provide a gear transmission for connecting two rotatable members which effects a positive driving connection irrespective of which member is in driving relation.

Still another object is to provide a rolling gear transmission interposed between two rotatable members having attached to one rotatable member an inner gear element disposed within a floating intermediate gear element which in turn is enclosed within an outer internal gear element integral with the outer rotatable member.

Still a further object is to provide a transmission mechanism for gears which ensures smooth rotational engagement of the gear teeth.

With these and other objects in view which will become apparent from the ensuing description and claims, the following sets forth the details of construction and combination of parts of a specific embodiment of the transmission of my invention, which I illustrate as an example, and which will best be understood when read in conjunction with the accompanying drawing in which:

Figure 1:
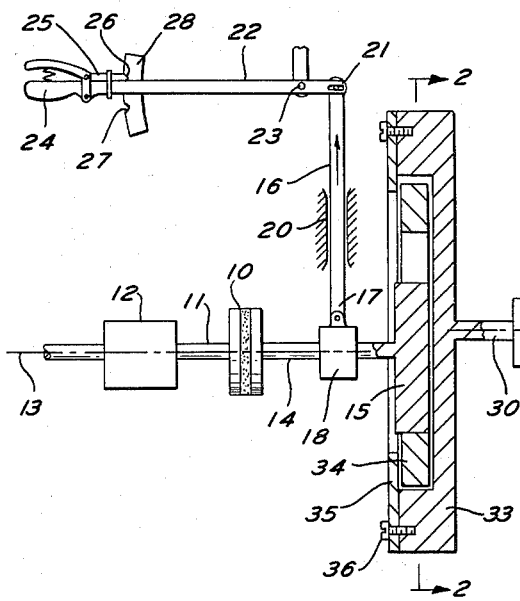
FIG. 1 is a fragmentary side-elevational view, partly in section, of the gear transmission of my invention in engaged position.

Referring now to the drawing, I have shown in FIG. 1 a flexible coupling 10 mounted on the end of a drive shaft 11 which is suitably intermediately journaled in a bearing 12 for rotation about an axis 13. Extending outwardly from the coupling 10, which may be of any conventional design of universal or flexible joint, is a stub 14 having a gear 15 fixed to its end. The orientation of the axis of the shaft 14 relative to the axis of the shaft 11 is controlled by a control rod 16 having its end 17 pivoted to a movable journal 18 which suitably engages the shaft 14 rotatable therein. The rod 16 is guided for movement perpendicular to the axis of the shaft 11 by fixed ways 20 and is pivoted in the slotted end 21 of an operating lever 22 disposed transversely to the rod 16 and oscillatable about a fixed pivot 23. The other end of the lever 22 is provided with a handle 24 having a spring biased detent element 25 engageable in either of two notches 26 or 27 in a fixed arcuate guide 28. When the element 25 is engaged in the notch 26 and shaft 14 is aligned with the shaft 11 as illustrated in FIG. 1.

Figure 2:
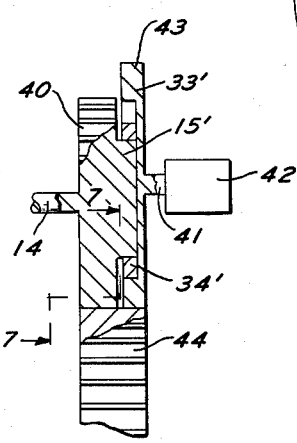
FIG. 2 is a slightly reduced section on the line 2—2 of FIG. 1.

A driven shaft 30, journaled in a bearing 31 is rotatable about an axis 32 parallel to and offset upwardly from the axis 13 of the shaft 11. A hollow cylindrical internal gear member 33 is mounted on the end of the shaft 30 for rotation therewith and surrounds the gear 15. Disposed between the inner gear 15 and the outer internal gear 33 is a floating annular gear element 34 toothed internally for engagement with the gear 15 and externally for engagement with the gear 33. The internal gear of the element 34 has one more tooth than the gear 15, and the gear 33 has one more tooth than the external gear of the element 34. As illustrated in FIG. 2, the gear 15 may have six teeth, the internal and external gears of the element 34 each may have seven teeth, and the internal gear 33 may have eight teeth.

In the coupled position illustrated in FIGS. 1 and 2, the axes of the shafts 14 and 30 are parallel and the gear 15 rotatable about the point 13' is in driving engagement with the floating gear 34 which in turn is in driving engagement with the internal gear 33 rotatable about the point 32'. An annular shroud plate 35 attached to the member 33 by screws 36 retains the element 34 within the member 33.

Figure 3:
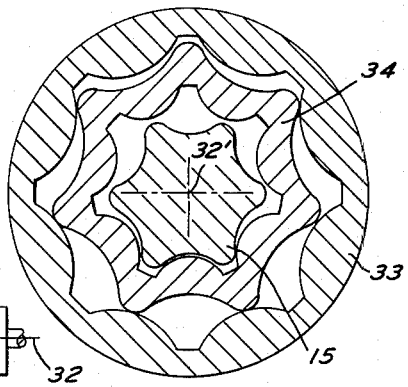
FIG. 3 is a view similar to FIG. 2 showing the gear transmission in disengaged position.

Downward movement of the handle 24 to the position of engagement of the detent 25 in the notch 27 moves the journal 18 and with it the end of shaft 14 and gear 15 upwardly as shown by the arrows in FIGS. 1 and 2 until the gear 15 is concentric with the shaft 30. In this position, illustrated in FIG. 3, the gear 15 is freely rotatable with respect to the gear 33 and the transmission is thus disengaged or uncoupled. In this disengaged position, rotation of the gear 15 causes the internal gear of the element 34 to roll around the gear 15 while the external gear of the element 34 rolls around within the internal gear 33. In effect, the annular element 34 rolls freely with a wobbling rotation, at greatly reduced speed with respect to the gear 15, without imparting any driving force to the member 33.

It is apparent that although the operation of the parts has been described with the shaft 11 driving the shaft 30, the shaft 30 may be used to drive the shaft 11 with equal effectiveness.

It is to be observed that in the engaged position of FIG. 1, the shafts 11 and 14 are aligned, thereby minimizing flexure stresses on the coupling 10 during transmission of power. In the disengaged position, with the shaft 14 angularly disposed with respect to the shaft 11, there is only the negligible torque on the coupling 10 of rolling the element 34 within the member 33.

Figures 4, 5:
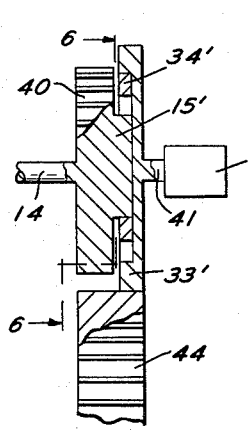
FIG. 4 is a fragmentary side elevational view, partly in section, of a modification showing the invention applied to a geared power transmission with the transmission in disengaged position.
FIG. 5 is a similar view showing the transmission of FIG. 4 in engaged position.
Figure 6:
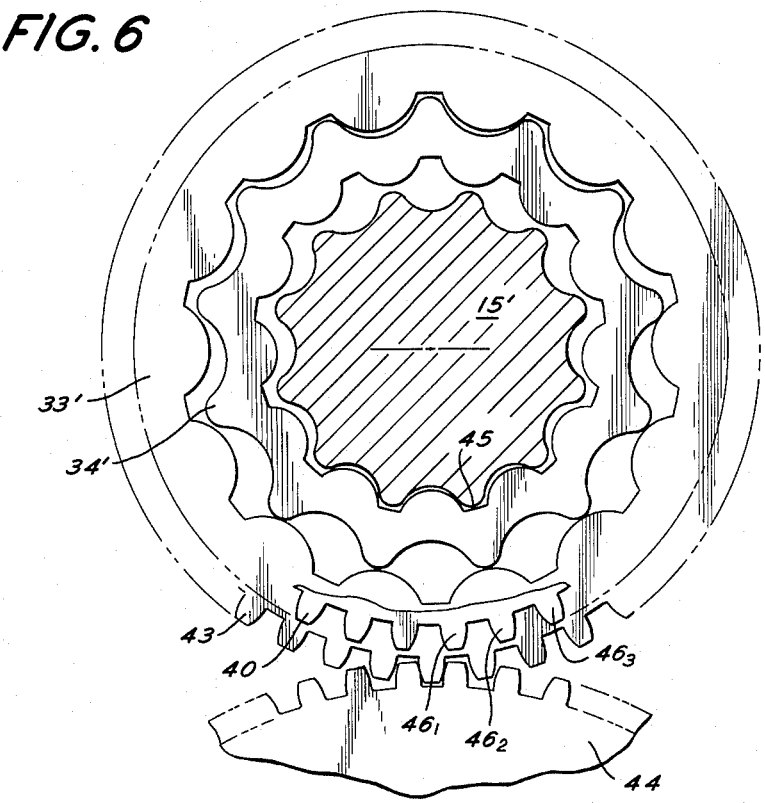
FIG. 6 is a greatly enlarged fragmentary section on the line 6—6 of FIG. 4.

In the modification illustrated is FIGS. 4 to 6, the stub shaft 14 has affixed to its end a drive gear 40 instead of the gear 15. Extending from the outer face of the gear 40 is an integral coaxial gear 15' disposed within a hollow cylindrical gear member 33' which is mounted on and rotatable with an idler shaft 41 journaled in a bearing 42. Disposed between the inner gear 15' and the outer internal gear 33' is a floating annular gear element 34' toothed internally for engagement with the gear 15' and externally for engagement with the gear 33'. The gears 15', 33' and 34' are respectively similar to the gears 15, 33 and 34 but are shown as having more teeth and the gear member 33' is provided with an external gear 43. The gear 15' may have 12 teeth, the internal and external gears of the element 34' each may have 13 teeth and the internal gear 33' may have 14 teeth, as illustrated.

Figure 7:
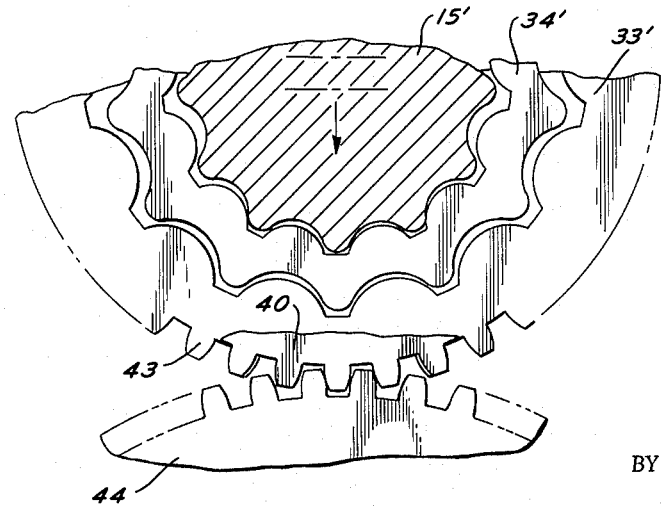
FIG. 7 is a similarly enlarged fragmentary section on the line 7—7 of FIG. 5.

In the engaged position of the gear transmission, shown in FIGS. 5 and 7, the shaft 14 is aligned with the drive shaft 11 and is parallel to but downwardly offset from the shaft 41. In this position, the drive gear 40 is engaged with a rotatable driven gear 44 for power transfer thereto. In the engaged position of the gear transmission, the gear 43 is also engaged with the driven gear 44 for rotatable association therewith and the pitch circles of the gears 40 and 43 are both tangent to the pitch circle of the gear 44. The transverse thickness of the gear 44 is sufficient to extend across both the gears 40 and 43 for simultaneous engagement therewith.

The gear transmission is disengaged by downward movement of the handle 24, as in the transmission of FIG. 1, to position the gear 15' concentrically with respect to the shaft 41 and the gear 33'. In this position, illustrated in FIGS. 4 and 6, the gear 40 is completely retracted from engagement with the gear 44 while the gear 43 remains in engagement with the gear 44 at all times.

The gear teeth on the gear 15' and on the gear 40 are interrelated in such manner that for any respective central angle subtended by a tooth or lobe of the gear 15' the registering equal central angle of the gear 40 is subtended by a tooth grouping which is identical for each tooth of the gear 15'. As illustrated in FIG. 6, the central angle of the gear 40 which is equal to and in registration with the central angle of the gear 15' subtended by the tooth 45, including half of the space between this tooth and the teeth on either side, contains the three teeth $46_1$, $46_2$ and $46_3$ of the gear 40, with the tooth $46_2$ radially aligned with the tooth 45, and this relation is replicated over the entire circumferences of these two gears. The gear 33' and the gear 43 are similarly related, there being three teeth on the gear 43 associated with each gap between the teeth or lobes of the gear 33' with the intermediate one of a respective group of three teeth aligned with the associated gap.

In the engaged position of the gear transmission shown in FIG. 7, the bottom tooth of the gear 15' is engaged in a tooth gap of the internal gear of the floating gear element 34' radially outward of which is a tooth of the external gear of this element which is engaged in a tooth gap at the bottom of the internal gear 33'. This radial alignment of the bottom tooth of the gear 15' with the tooth gap of the gear 33', intermediately meshed together by the gears of the element 34', insures that the three bottom teeth of the gear 40 and of the gear 43 are in register. Since the gear 43 is always meshed with the gear 44, it follows that the gear 40 is also meshed with the gear 44 for driving relation therewith.

In the disengaged position of the gear transmission, illustrated in FIG. 6, the idler gear 43 is meshed with the gear 44 and both are at rest, while the floating gear 34' rolls freely within the gear 33', the gear 15' rolls freely within the gear 34' and the gear 40 has been raised out of mesh with respect to the gear 44.

It is readily apparent that upon operation of the gear transmission into engaged position, the teeth of the gear 40 will always mesh freely with the teeth of the gear 44 because the proper meshing configuration is established by the engagement of the gear 43 with the gear 44.

The gears 15', 33' and 34' need not be of great strength because their function is largely to provide alignment of registration, with the major power transfer taking place between the gears 40 and 44.

As in the case of the device of FIG. 1, the gear 44 may be the driving gear to transmit power to the shaft 11, by a reversal of the action described in the foregoing.

The teeth and the gaps between the teeth of the gears 15, 15', 33, 33', 34 and 34' may be of any desired shape but are preferably shaped to produce smooth rolling action for noiseless operation and minimum wear.

Although the teeth of the internal gear of the element 34' are shown as radially aligned with the gaps between the teeth of the external gear of this element, this is a preferred form which provides uniform strength but is not a requisite for efficient operation. It is only necessary to assure that in the engaged position of the gear transmission, a tooth of the gear 40 will always be in register with a tooth of the gear 43 at the point of tangency of the pitch circles of these gears and of the gear 44.

It is further to be understood that the number of teeth shown for the respective transmission gears are merely selected as examples as the number to be used is merely a matter of expediency in design provided that the internal gear of the floating element has at least one more tooth than the inner gear and that the external gear of the floating element has at least one less tooth than the internal gear of the outer gear member.

Although the invention has been described in considerable detail, such description is intended as illustrative rather than limiting, as other embodiments as well as obvious modifications in construction and arrangement will be evident to those skilled in the art and may be made if desired without departing from the spirit or scope of my invention.

I claim:

1. A gear transmission comprising a driving gear, an annular element having an internal gear and an external gear surrounding said driving gear and rollably engageable therewith, a driven internal gear surrounding said element and rollably engageable with the external gear thereof, and means for selectively disposing said driving gear and said driven gear into concentric relation in which said element is freely rollable between said driving and driven gears without interchange of power between them and into an eccentric relation in which said driving and driven gears and the gears of said elements are in mesh for driving said driven gear.

2. The transmission of claim 1 wherein the internal gear of said element has a greater plurality of teeth than said driving gear and said driven gear has a greater plurality of teeth than the external gear of said element.

3. The transmission of claim 1 wherein the internal gear of said element has one more tooth than said driving gear and said driven gear has one more tooth than the external gear of said element.

4. The transmission of claim 1 wherein in said eccentric relation all said gears are in meshed relation on the side in alignment with and in the direction of the offset of the axis of said driving gear with respect to the axis of said driven gear.

5. The transmission of claim 1 wherein said means includes guided translatory means for moving said driving gear between said concentric and eccentric positions relative to said driven gear.

6. The transmission of claim 5 in which said translatory means is provided with means for limiting the translatory movement and for releasably maintaining said driving gear in either selected position.

7. A gear transmission for engaging rotatable driving and driven members comprising a first gear on and rotatable with said driving member, a hollow cylindrical member having an internal gear surrounding said first gear and rotatably associated with said driven member, an annular gear element interposed between said first gear and said internal gear of said hollow member, said element having an internal gear engageable with said first gear and an external gear engageable with the internal gear of said hollow member, the internal gear of said element having one more tooth than said first gear and the external gear of said element having one less tooth than the internal gear of said hollow member, said members and said element being proportioned and arranged such that said first gear is movable transversely to its axis into a first position eccentric with respect to the axis of said hollow member in which the internal and external gears of said element are engaged respectively with said first gear and the internal gear of said hollow member for driving said hollow member and into a second position coaxial with respect to said hollow member in which said element is rollably engaged with said first gear and said hollow member without imparting any driving force thereto, and means to position said first gear selectively in said first position and in said second position.

8. The transmission of claim 7 wherein said driving member is a stub shaft connected by a flexible coupling to a drive shaft and said means includes a journal engaging said stub shaft and movable transversely thereto.

9. The transmission of claim 7 including a driving gear mounted on said driving member and rotatable concentrically with said first gear, a driven gear engageable in meshed relation with said driving gear when said first gear is in said first position and disengaged therefrom in said second position and said hollow member having a concentric external gear in meshed engagement with said driven gear at all times.

10. The transmission of claim 9 wherein for each central angle of said first gear subtended by a tooth thereof, the respective registering equal central angle of the driving gear is subtended by a tooth grouping which is identical for each such central angle of said first gear.

11. The transmission of claim 9 wherein said transmission has capacity for so synchronizing said driven gear in relation to said driving gear that when said driving gear is moved from the disengaged second position into engagement with said driven gear said driving and driven gears will mesh smoothly.

References Cited by the Examiner

UNITED STATES PATENTS 3,037,400  6/1962  Sundt _____ 74—804

FOREIGN PATENTS 583,062  12/1946  Great Britain.

DON A. WAITE, *Primary Examiner*.